(12) United States Patent
Djelouah et al.

(10) Patent No.: US 12,010,335 B2
(45) Date of Patent: Jun. 11, 2024

(54) MICRODOSING FOR LOW BITRATE VIDEO COMPRESSION

(71) Applicants: Disney Enterprises, Inc., Burbank, CA (US); ETH Zürich (EIDGENÖSSISCHE TECHNISCHE HOCHSCHULE ZÜRICH), Zürich (CH)

(72) Inventors: Abdelaziz Djelouah, Zürich (CH); Leonhard Markus Helminger, Zurich (CH); Roberto Gerson de Albuquerque Azevedo, Zurich (CH); Christopher Richard Schroers, Uster (CH); Scott Labrozzi, Cary, NC (US); Yuanyi Xue, Kensington, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/704,722

(22) Filed: Mar. 25, 2022

(65) Prior Publication Data

US 2022/0337852 A1 Oct. 20, 2022

Related U.S. Application Data

(60) Provisional application No. 63/255,280, filed on Oct. 13, 2021, provisional application No. 63/172,315, filed on Apr. 8, 2021.

(51) Int. Cl.
*H04N 19/42* (2014.01)
*H04N 19/124* (2014.01)
*H04N 19/13* (2014.01)

(52) U.S. Cl.
CPC ................................ *H04N 19/42* (2014.11)

(58) Field of Classification Search
None
See application file for complete search history.

(56) References Cited

U.S. PATENT DOCUMENTS

2021/0067808 A1    3/2021    Schroers
2021/0099731 A1*   4/2021    Zhai .................. H04N 19/12
(Continued)

FOREIGN PATENT DOCUMENTS

| JP | 2020-136884 | 8/2020 |
| JP | 2020136884 A | 8/2020 |
| WO | 2020/107877 A1 | 6/2020 |

OTHER PUBLICATIONS

Chang et al. ("TinyGAN: Distilling BigGAN for Conditional Image Generation" Institute of Informational Science, Academia Sinica, Taiwan; hereinafter Chang). (Year: 2020).*

(Continued)

*Primary Examiner* — Samuel D Fereja
(74) *Attorney, Agent, or Firm* — Farjami & Farjami LLP

(57) ABSTRACT

A system includes a machine learning (ML) model-based video encoder configured to receive an uncompressed video sequence including multiple video frames, determine, from among the multiple video frames, a first video frame subset and a second video frame subset, encode the first video frame subset to produce a first compressed video frame subset, and identify a first decompression data for the first compressed video frame subset. The ML model-based video encoder is further configured to encode the second video frame subset to produce a second compressed video frame subset, and identify a second decompression data for the second compressed video frame subset. The first decompression data is specific to decoding the first compressed video frame subset but not the second compressed video frame subset, and the second decompression data is specific (Continued)

to decoding the second compressed video frame subset but not the first compressed video frame subset.

16 Claims, 7 Drawing Sheets

(56) References Cited

U.S. PATENT DOCUMENTS

2022/0086463 A1* 3/2022 Coban .................. H04N 19/136
2022/0103839 A1* 3/2022 Van Rozendaal ...... H04N 19/13

OTHER PUBLICATIONS

Eirikur Agustsson, Michael Tschannen, Fabian Mentzer, Radu Timofte, and Luc Van Gool. Generative adversarial networks for extreme learned image compression. In *The IEEE InternationalConference on Computer Vision (ICCV)*, Oct. 2019.
Johannes Ballé, Valero Laparra, and Eero P. Simoncelli. End-to-end optimized image compression. *CoRR*, abs/1611.01704, 2016.
Johannes Ballé, David Minnen, Saurabh Singh, Sung Jin Hwang, and Nick Johnston. Variational image compression with a scale hyperprior. *ICLR*, 2018.
Lucas Beyer, Xiaohua Zhai, Amélie Royer, Larisa Markeeva, Rohan Anil, and Alexander Kolesnikov. Knowledge distillation: A good teacher is patient and consistent. *arXiv preprint* arXiv:2106.05237, 2021.
Andrew Brock, Jeff Donahue, and Karen Simonyan. Large scale GAN training for high fidelity natural image synthesis. *CoRR*, abs/1809.11096, 2018.
Ting-Yun Chang and Chi-Jen Lu. Tinygan: Distilling biggan for conditional image generation. *CoRR*, abs/2009.13829, 2020.
Abdelaziz Djelouah, Joaquim Campos, Simone Schaub-Meyer, and Christopher Schroers. Neural inter-frame compression for video coding. In *Proceedings of the IEEE International Conference of Computer Vision*, pp. 6421-6429, 2019b.
Leonhard Helminger, Abdelaziz Djelouah, Markus Gross, and Christopher Schroers. Lossy image compression with normalizing flows. *arXiv preprint* arXiv:2008.10486, 2020.
Diederik P. Kingma and Jimmy Ba. Adam: A method for stochastic optimization. In Yoshua Bengio and Yann LeCun, editors, *3rd International Conference on Learning Representations, ICLR 2015*, San Diego, CA, USA, May 7-9, 2015, Conference Track Proceedings, 2015.
Théo Ladune, Pierrick Philippe, Wassim Hamidouche, Lu Zhang, and Olivier Déforges. Conditional coding for flexible learned video compression. *arXiv preprint* arXiv:2104.07930, 2021.
Guo Lu, Wanli Ouyang, Dong Xu, Xiaoyun Zhang, Chunlei Cai, and Zhiyong Gao. DVC: an end-to-end deep video compression framework. In *IEEE Conference on Computer Vi-sion and Pattern Recognition, CVPR 2019*, Long Beach, CA, USA, Jun. 16-20, 2019, pp. 11006-11015. Computer Vision Foundation / IEEE, 2019a.
Theo Ladune, Pierrick Philippe, Wassim Hamidouche, Lu Zhang, Olivier Deforges "Optical Flow and Mode Selection for Learning-based Video Coding" Aug. 6, 2020 6 Pgs.
Guo Lu, Wanli Ouyang, Dong Xu, Xiaoyun Zhang, Chunlei Cai, Zhiyong Gao "DVC: An End-to-end Deep Video Compression Framework" 2019 IEEE/CVF Conference on Cmputer Vision and Pattern Recognition (CVPR) pp. 10998-11007.
Siwei Ma, Xinfeng Zhang, Chuanmin Jia, Zhenghui Zhao, Shiqi Wang, Shanshe Wang "Image and Video Compression with Neural Networks: A Review" IEEE Transactions on Circuits and Systems for Video Technology Apr. 10, 2019 16 Pgs.
Adam Golinski, Reza Pourreza, Yang Yang, Guillaume Sautiere, Taco S. Cohen "Feedback Recurrent Autoencoder for Video Compression" Apr. 9, 2020 29 Pgs.
Leonhard Helminger, Roberto Azevedo, Abdelaziz Djelouah, Markus Gross, Christopher Schroers "Microdosing: Knowledge Distillation for GAN based Compression" 2021 13 Pgs.
Extended European Search Report dated Oct. 10, 2022 for EP Application 22165891.7.
Abdelaziz Djelough, Joaquim Campos, Simone Schaub-Meyer, Christopher Schroers "Neural Inter-Frame Compression for Video Coding" 2019 IEEE/CVF International Conference on Computer Vision (IVVC). pp. 6420-6428.
Fabian Mentzer, George Toderici, Michael Tschannen, Eirikur Agustsson "High-Fidelity Generative Image Compression" $34^{th}$ Conference on Neural Information Processing Systems (NeurIPS 2020), Vancouver, Canada pp. 1-20.
Ties van Rozendaal, Iris A.M. Huijben, Taco S. Cohen "Overfitting for Fun and Profit: Instance-Adaptive Data Compression" Published as a Conference Paper at ICLR 2021 pp. 1-18.
Ying-Yun Chang and Chi-Jen Lu "TinyGAN: Distilling BigGAN for Conditional Image Generation" Institute of Informational Science, Academia Sinica, Taiwan. pp. 1-21.
Extended European Search Report dated Sep. 7, 2022 for EP Application 22165396.0. 12 Pgs.
Theo Ladune, Pierrick Philippe, Wassim Hamidouche, Lu Zhang, Olivier Deforges "Optical Flow and Mode Selection for Learning-based Video Coding" MMSP 2020, IEEE 22nd International Workshop on Multimedia Signal Processing, Sep. 2020, Tampere, Finland. hal-02911680 6 Pgs.
Guo Lu, Wanli Ouyang, Dong Xu, Xiaoyun Zhang, Chunlei Cai, Zhiyong Gao "DVC: An End-to-end Deep Video Compression Framework" 2019 IEEE/CVF Conference on Computer Vision and Pattern Recognition (CVPR) 10 Pgs.
Siwei Ma, Xinfeng Zhang, Chuanmin Jia, Zhenghui Zhao, Shiqi Wang and Shanshe Wang "Image and Video Compression with Neural Networks: A Review" IEEE Transactions on Circuits and Systems for Video Technology Apr. 2019 16 Pgs.
Ties van Rozendall, Iris A.M. Huijben, Taco S. Cohen "Overfitting for Fun and Profit: Instance-Adaptive Data Compression" ICLR 2021 Conference Jan. 2021 18 Pgs.
Ting-Yun Chen, Chi-Jen Lu "TinhGAN: Distilling BigGAN for Conditional Image Generation" ACCV 2020. Lecture Notes in Computer Science, vol. 12625 16 Pgs.
CA Office Action dated Aug. 29, 2023 for JP Application 2022-062152.
CA Office Action dated Nov. 29, 2023 for Korean Patent Application 10-2022-0041682.

* cited by examiner

MICRODOSING FOR LOW BITRATE VIDEO COMPRESSION

RELATED APPLICATIONS

The present application claims the benefit of and priority to Provisional Patent Application Ser. No. 63/172,315, filed Apr. 8, 2021, and titled "Neural Network Based Video Codecs," and Provisional Patent Application Ser. No. 63/255,280, filed Oct. 13, 2021, and titled "Microdosing For Low Bitrate Video Compression," which are hereby incorporated fully by reference into the present application.

BACKGROUND

Video content represents the majority of total Internet traffic and is expected to increase even more as spatial resolution frame rate, and color depth of videos increase and more users adopt earning services. Although existing codecs have achieved impressive performance, they have been engineered to the point where adding further small improvements is unlikely to meet future demands. Consequently, exploring fundamentally different ways to perform video coding may advantageously lead to a new class of video codecs with improved performance and flexibility.

For example, one advantage of using a trained machine learning (ML) model, such as a neural network (NN), in the form of a generative adversarial network (GAN) for example, to perform video compression is that it enables the ML model to infer visual details that it would otherwise be costly in terms of data transmission, to obtain. However, the model size remains an important issue in current state-of-the-art proposals and existing solutions require significant computation effort on the decoding side. That is to say, one significant drawback of existing GAN-based compression frameworks is that they typically require large decoder models that are sometimes trained on private datasets. Therefore, retraining these models to their original performance is not generally possible, and even when the training data is available, retraining the model would be complicated and time consuming. Moreover, the memory requirements and the inference time of exiting large decoder models make them less practical, especially in the context of video coding.

DETAILED DESCRIPTION

Figure 1:
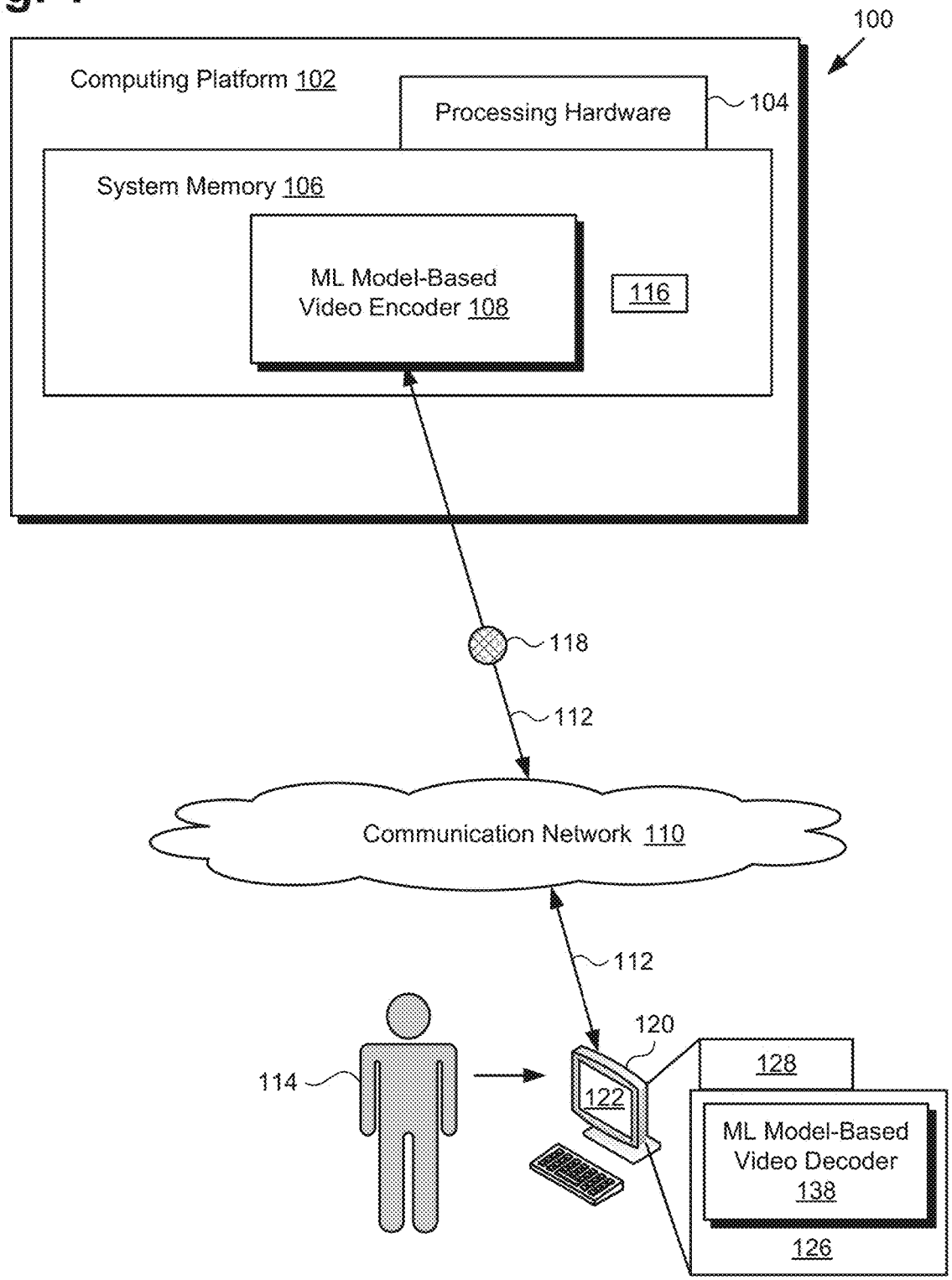
FIG. 1 shows a diagram of an exemplary system providing a machine learning (ML) model-based video codec, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application is directed to systems and methods for providing machine learning (ML) model-based video codecs. In addition, the present application discloses a knowledge distillation (KD) approach that enables the retention of good perceptual image quality while reducing the size of the decoder. According to the present novel and inventive principles, the goal of KD is to transfer the learned knowledge of a teacher network to a smaller student network that remains competitive to the teacher network's performance. By requiring less memory and computational power than the initial teacher network, the student network could, for instance, run on less powerful devices such as mobile phones or dedicated devices. The ability to compress the generator network or decoder in the auto-encoder setting, as disclosed herein, is advantageous both in terms of memory requirements and computational efficiency. This is especially important for image and video compression, where the majority of the computation should preferably be performed on the sender (encoder) side, while the decoding should be simple. Especially in the context of video streaming, an asset will typically be encoded once for distribution, but may be decoded millions of times.

One advantage of using a trained machined learning model, such as an artificial neural network (NN) for example, to perform video compression is that it enables the machine learning model to infer visual details that it would otherwise be costly in terms of data transmission to obtain. Consequently, the resulting images are typically visually pleasing without requiring a high bitrate. Some image details synthesized when using a machine learning model-based video codec may look realistic while deviating slightly from the ground truth. Nevertheless, the present machine learning model based video compression solution is capable of providing image quality that would be impossible using the same amount of transmitted data in conventional approaches. Moreover, in some implementations, the present machine learning model-based solution can be implemented as substantially automated systems and methods.

It is noted that, as used in the present application, the terms "automation," "automated," and "automating" refer to systems and processes that do not require the participation of a human user, such as a human editor or system administrator. Although, in some implementations, a human system administrator may review the performance of the automated systems operating according to the automated processes described herein, that human involvement is optional. Thus, the processes described in the present application may be performed under the control of hardware processing components of the disclosed systems.

It is further noted that, as defined in the present application, the expression "machine learning model" (hereinafter "ML model") refers to a mathematical model for making future predictions based on patterns learned from samples of data obtained from a set of trusted known matches and known mismatches, known as training data. Various learning algorithms can be used to snap correlations between input data and output data. These correlations form the mathematical model that can be used to make future predictions on new input data. Such a predictive model may include one or more logistic regression models, Bayesian models, or NNs, for example. In addition, machine learning models may be designed to progressively improve their performance of a specific task.

A "deep neural network" (deep NN) in the context of deep learning, may refer to an NN that utilizes multiple hidden layers between input and output layers, which may allow for learning based on features not explicitly defined in raw data. As used in the present application, a feature labeled as an NN refers to a deep neural network. In various implementations, NNs may be utilized to perform image processing or natural-language processing. Although the present novel and inventive principles are described below by reference to an exemplary NN class known as generative adversarial networks (GANs), that characterization is provided merely for the interests of conceptual clarity.

FIG. 1 shows an exemplary system for performing machine learning (ML) model-based video compression, according to one implementation. As shown in FIG. 1, system 100 includes computing platform 102 having processing hardware 104 and system memory 106 implemented as a computer-readable non-transitory storage medium. According to the present exemplary implementation, system memory 106 stores uncompressed video sequence 116 and ML model-based video encoder 108.

As further shown in FIG. 1, system 100 is implemented within a use environment including communication network 110 and user system 120 configured for use by user 114. User system 120 includes display 122, user system processing hardware 124, and user system memory 126 implemented as a computer-readable non-transitory storage medium storing ML model-based video decoder 128. In addition, FIG. 1 shows network communication links 112 interactively connecting user system 120 with system 100 via communication network 110, as well as compressed video bitstream 118 output by ML model-based video encoder 108 and corresponding to uncompressed video sequence 116.

Although the present application refers to ML model-based video encoder 108 as being stored in system memory 106 for conceptual clarity, more generally system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, although FIG. 1 depicts ML model-based video encoder 108 as being stored in its entirety in system memory 106 that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100. Consequently, in some implementations, one or more of the features of ML model-based video encoder 108 may be stored remotely from one another on the distributed memory resources of system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as ML model-based video encoder 108, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over communication network 110 in the form of a packet-switched network such as the Internet, for example. Moreover, in some implementations, communication network 110 may be a high-speed network suitable for high performance computing (HPC), for example a 10 GigE network or an Infiniband network. In some implementations, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

According to the implementation shown by FIG. 1, user 114 may utilize user system 120 to interact with system 100 over communication network 110. User system 120 and communication network 110 enable user 114 to obtain compressed video bitstream 118 corresponding to uncompressed video sequence 116 from system 100.

Although user system 120 is shown as a desktop computer in FIG. 1, that representation is provided merely as an example. More generally, user system 120 may be any suitable mobile or stationary computing device or system that implements data processing capabilities sufficient to provide a user interface, support connections to communication network 110, and implement the functionality ascribed to user system 120 herein. For example, in some implementations, user system 120 may take the form of a laptop computer, tablet computer, smartphone, or game console, for example. However, in other implementations user system 120 may be a "dumb terminal" peripheral component of system 100 that enables user 114 to provide inputs via a keyboard or other input device, as well as to video content via display 122. In those implementations, user system 120 and display 122 may be controlled by processing hardware 104 of system 100.

With respect to display 122 of user system 120, display 122 may be physically integrated with user system 120 or may be communicatively coupled to but physically separate from user system 120. For example, where user system 120 is implemented as a smartphone, laptop computer, or tablet computer, display 122 will typically be integrated with user system 120. By contrast, where user system 120 is implemented as a desktop computer, display 122 may take the form of a monitor separate from user system 120 in the form of a computer tower. Moreover, display 122 may take the form of a liquid crystal display (LCD), a light-emitting diode (LED) display, an organic light-emitting diode (OLED) display, a quantum dot (QD) display, or a display using any other suitable display technology that performs a physical transformation of signals to light.

By way of background, a mapping from image space to latent space may be achieved using ML, model-based video encoder 108, where the bottleneck values constitute the latent representation. A function g denotes the mapping from image space to latent space performed by ML model-based video encoder 108, and $g^{-1}$ denotes the reverse mapping. An uncompressed original image x is first mapped to its latent representation y=g(x). After quantization, the resulting quantized latents $\hat{y}$ are encoded losslessly to compressed video bitstream 118 that can be decoded into the uncompressed image $\hat{x}=g^{-1}(\hat{y})$ that corresponds to original image x.

Image compression can formally be expressed as minimizing the expected length of the bitstream as well as the expected distortion of the reconstructed image compared to the original, formulated as optimizing the following rate-distortion objective function:

$$L_{g,p_{\hat{y}}} = \mathbb{E}_{x \sim p_x}[-\log_2 p_{\hat{y}}(\hat{y}) + \lambda d(x,\hat{x})] \qquad \text{(Equation 1)}$$

where: $-\log_2 p_{\hat{y}}(\hat{y})$ is the rate term and $d(x,\hat{x})$ is the distortion term.

It is noted that in the notation used in Equation 1, the parameters of g include $g^{-1}$. Here d indicates a distortion measure and can include a combination of $l_2$, structural similarity index measure (SSIM), learned perceptual image patch similarity (LPIPS), and the like. The rate corresponds to the length of the bitstream needed to encode the quantized representation $\hat{y}$, based on a learned entropy model $p_{\hat{y}}$ over the unknown distribution of natural images $p_x$. By reducing the weight λ, better compression can be achieved at the cost of larger distortion on the reconstructed image.

According to one implementation of the present novel and inventive concepts, the ML model-based image compression formulation described above can be augmented with an ML model in the form of a conditional GAN. In such a case of adversarial training, D is denoted as the discriminator neural network that learns to distinguish between the ground truth x and the decoded images $\hat{x}$ conditioned on the latent representation $\hat{y}$:

$$L_D = \mathbb{E}_{x \sim p_x}[-\log(1-D(\hat{x},\hat{y}))-\log(D(x,\hat{y}))] \qquad \text{(Equation 2)}$$

The training of the discriminator is alternated with the training of image compression ML model 232, in which case the rate-distortion objective augmented with the adversarial loss is optimized:

$$L_{g,p_{\hat{y}}} = \mathbb{E}_{x \sim p_x}[-\log_2 p_{\hat{y}}(\hat{y}) + \lambda d(x,\hat{x}) + \beta \log D(\hat{x},\hat{y})] \qquad \text{(Equation 3)}$$

where: $-\log_2 p_{\hat{y}}$ and $d(x,\hat{x})$ remain the rate and distortion terms, respectively, while) $D(\hat{x},\hat{y})$ is the adversarial loss.

In order to take advantage of temporal redundancy in video encoding, video compression relies on information transfer through motion compensation. More precisely, a subsequent frame $x_{t+1}$ can be predicted from its preceding frame $x_t$ by considering motion information. As defined in the present application, the expression "motion compensation" refers to the full process that computes and encodes motion vectors, as well as any post-processing that may occur. For simplicity, it is assumed that motion compensation has been completed, and the result is an estimate of the image $\tilde{x}_{t+1}$ and a motion vector field $\hat{m}_{t+1}$.

Figure 2:
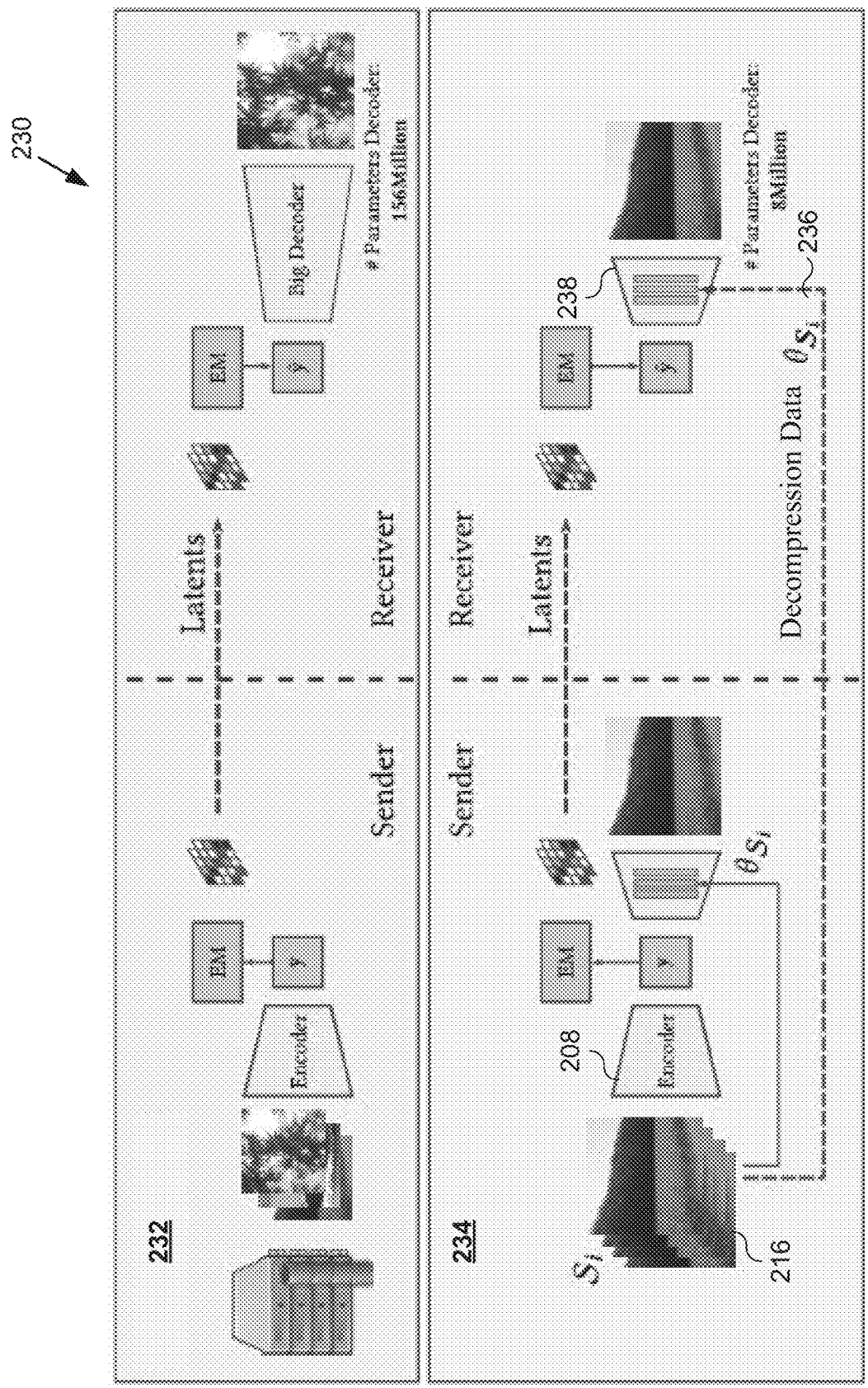
FIG. 2 shows a diagram comparing an existing approach to neural compression with an exemplary microdosing compression approach, according to one implementation.

Microdosing for Low Bitrate Compression:

FIG. 2 shows diagram 230 comparing an existing approach 232 to neural compression with the microdosing compression approach 234 introduced by the present application. The present microdosing compression approach 234 is based on: 1) training a reduced student-decoder with data generated from a large decoder, 2) overfitting the reduced student-decoder model to a specific image or set of images, and 3) sending the specialized decoder weights as decompression data 236 alongside the image latents. To showcase the viability of the present microdosing compression approach, its incorporation into state-of-the-art models for neural image and video compression targeting the low bitrate setting is described.

First, a High-Fidelity Compression (HiFiC) or other high-performance decoder is replaced with a much smaller student-decoder. It is noted that HiFiC presently provides the state-of-the-art in low bitrate neural image compression (i.e., approximately 0.15 bits per pixel) and produces extremely competitive results at the cost of a relatively big (i.e., approximately 156 million parameters) decoder network. However, although a HiFiC architecture is shown to be utilized in existing approach 232, that representation is merely exemplary. In other implementations, the HiFiC encoder-decoder network of existing approach 232 may be replaced by substantially any GAN trained network having a similar architecture based on residual blocks.

By contrast to existing approach 232, microdosing compression approach 234 disclosed by the present application advantageously allows for a much smaller decoder (e.g., approximately 8 million parameters) and fifty percent (50%) faster decoding time wile producing output images that are visually similar to those provided by HiFiC. Second, the application of the present microdosing KD strategy in a neural video compression framework based on latent, residuals is described. In such a scenario, the reduced student-decoder is overfitted to a sequence so that a sequence specific decoder can be provided.

As shown in FIG. 2, according to existing approach 232 to neural compression, the encoder-decoder pair is trained on a big dataset, to get an overall good performance on a variety of different content. Once the auto-encoder is fully trained, the decoder gets deployed and sent to the receiver. The big decoder then enables the decoding of any type of content.

According to the present microdosing approach 234 by contrast, ML model-based video encoder 208 is configured to partition uncompressed video sequence 216 data into subsets $S_i$, and to learn a content-specific decoder with corresponding information $\theta S_i$ for each subset. This specialization enables the training of a ML model-based video decoder 238 that advantageously requires fewer parameters, a smaller memory footprint, and using fewer computations. It is noted that ML model-based video encoder 208, uncompressed video sequence 216, and ML model-based video decoder 238 correspond respectively in general to ML model-based video encoder 108, uncompressed video sequence 116, and ML model-based video decoder 138, in FIG. 1. Consequently, ML model-based video encoder 108, uncompressed video sequence 116, and ML model-based video decoder 138 may share any of the features attributed to respective ML model-based video encoder 208, uncompressed video sequence 216, and ML model-based video decoder 238 by the present disclosure, and vice versa.

Once ML model-based video decoder 238 is fully trained, and the reconstruction quality requirement of ML model-based video encoder 108 for the subset is fulfilled, the content-specific information (e.g., decompression data 236) may be stored alongside the subset. If ML model-based video decoder 238 wants to decode an image $x \in S_i$, the subset specific decompression data $\theta_{S_i}$, in the form of weights, has to be sent only once per subset. A procedure for applying the present microdosing KD approach to image compression with GANs and its extension to video compression using latent space residuals is discussed below.

Figure 3:
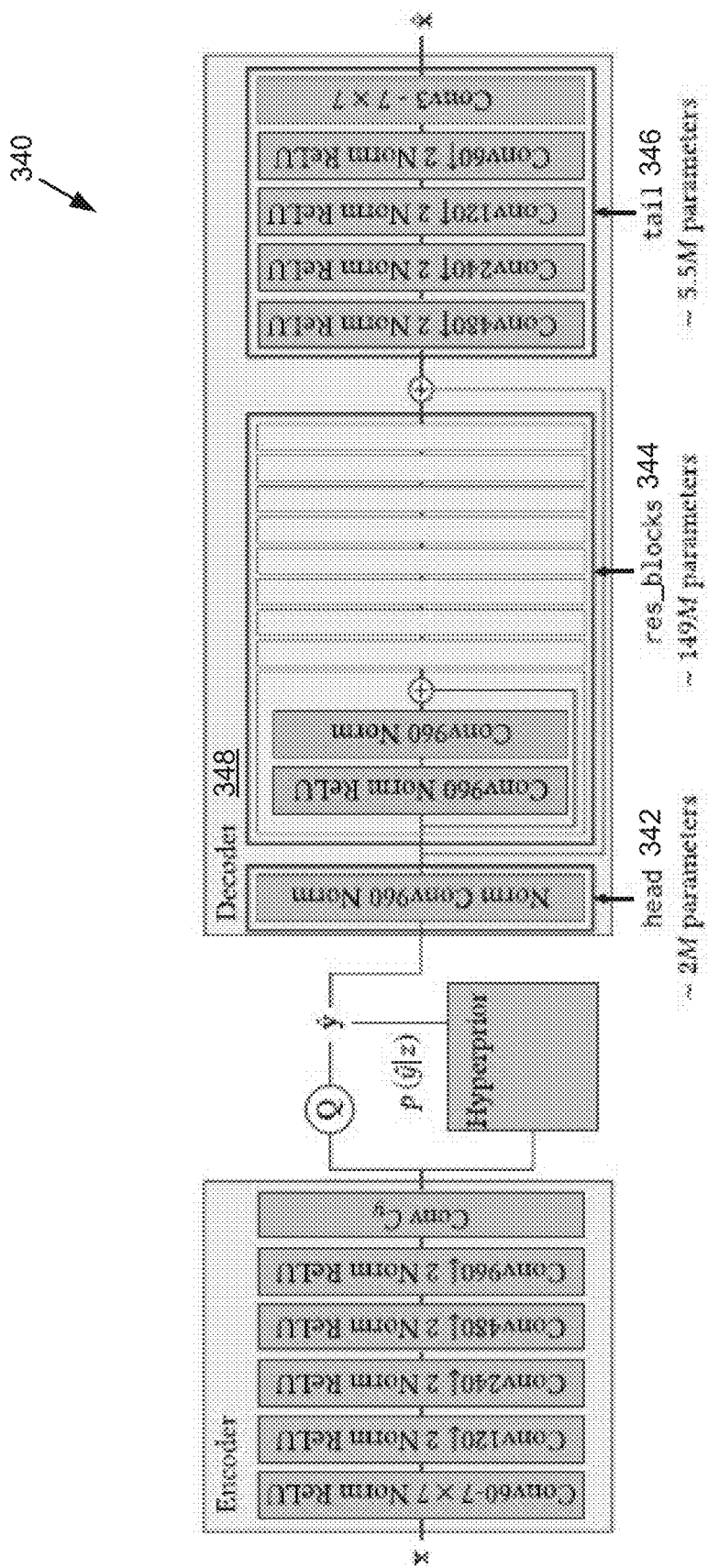
FIG. 3 shows an existing high-performance codec including a large decoder, according to one implementation.

FIG. 3 shows a traditional HiFiC architecture 340. Its decoder 348 can be divided into three sub-nets: head 342 including approximately two million (2M) parameters, residual network (res_blocks) 344 including approximately 149M parameters, and tail 346 including approximately 5.5M parameters. It is noted that the coarse information of an image processed using HiFiC architecture 340 is saved in the latent space, and the hallucination of the texture is generated by res_blocks 344 of decoder 348. In particular, the size of res_blocks 344 is due to the model having been trained on a large (private) dataset, thus such a large size is needed to capture all the textures seen during training.

However, if it is known in advance which images should be compressed (e.g., frames of a video sequence having similar features), it is possible to overfit to that data during encoding and send only the necessary weights to properly decode those images (i.e., decompression data 236). That is what is implemented using the NN architecture disclosed in the present application and described by reference to FIGS. 4A and 4B.

Figure 4A:
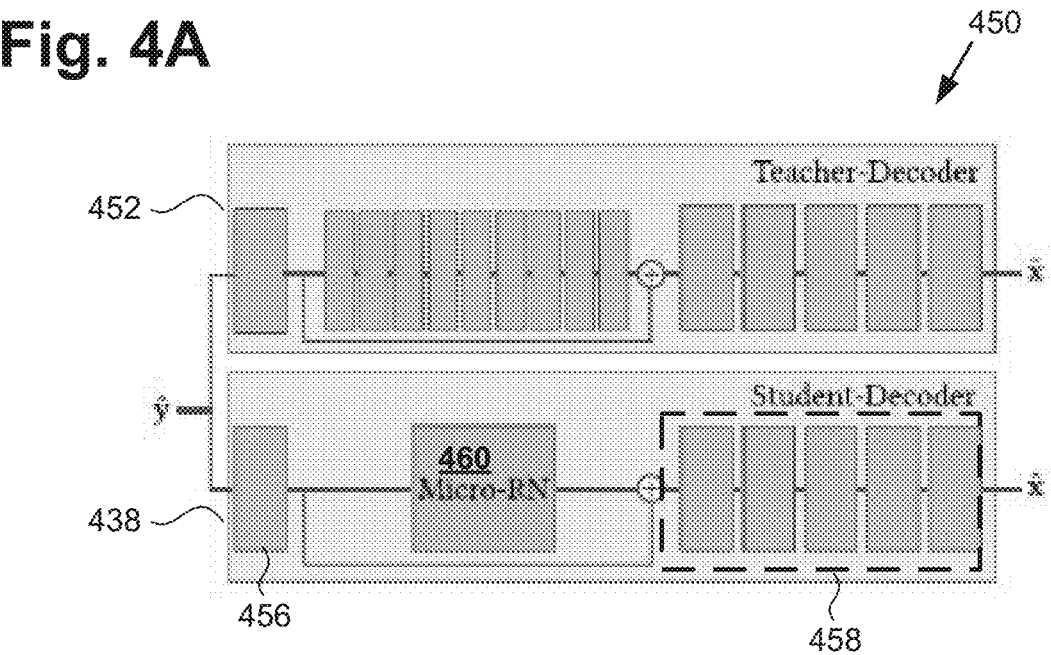
FIG. 4A depicts training of a small student decoder using a teacher decoder, according to one exemplary implementation of the present concepts.
Figure 4B:
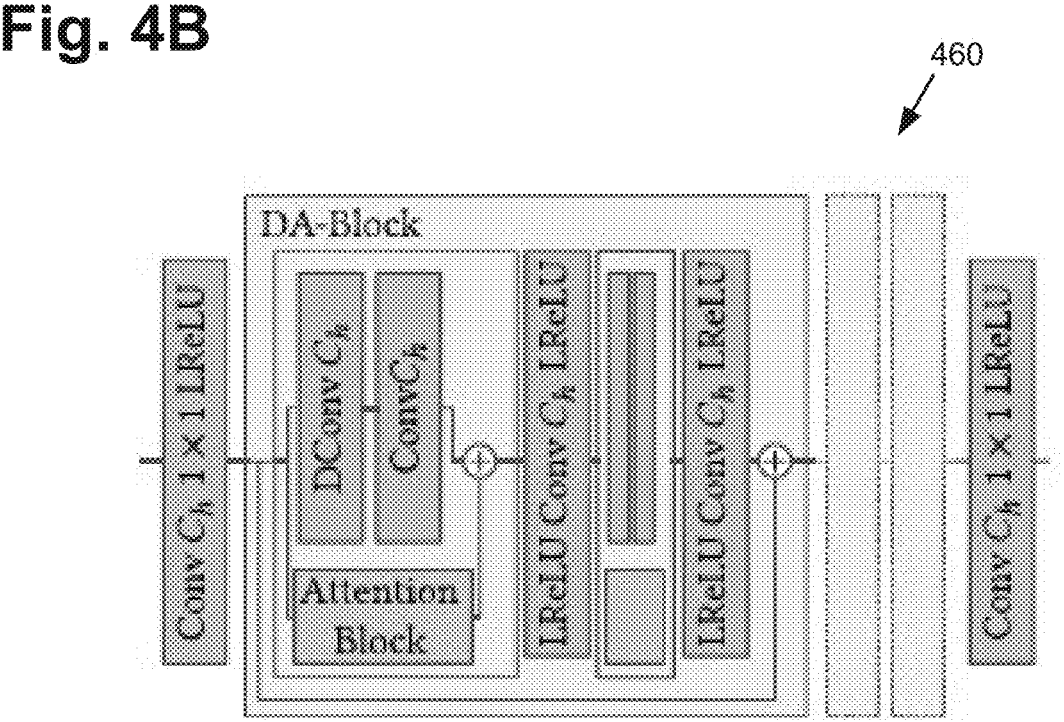
FIG. 4B depicts an exemplary ML model-based decoding network suitable for use in the small student decoder shown in FIG. 4A, according to one implementation.

According to the exemplary implementation shown by FIGS. 4A and 4B, the size of student-decoder 438 is significantly reduced relative to that of teacher-decoder 452 by training a smaller sub-network, Micro-Residual-Network (Micro-RN) 460, that mimics the behavior of the res_blocks 344, in FIG. 3, for a specific subset of images, thereby microdosing the hallucination capability of student-decoder 438. As noted above, as an alternative to a HiFiC architecture, in some implementations the present novel and inventive principles may be applied to substantially any GAN trained network having a similar architecture based on residual blocks. In such GAN trained network implementations, the residual block portion of the GAN trained network decoder could be replaced by Micro-RN 460. It is further noted that student-decoder 438 corresponds in general to ML model-based video decoders 138 and 238, in FIGS. 1 and 2, and those corresponding features may share any of the characteristics attributed to either corresponding feature may the present disclosure. That is to say, like student-decoder 438, ML model-based video decoders 138 and 238 may include Micro-RN 460.

According to the exemplary implementation shown in FIG. 4B, Micro-RN 460 is based on degradation-aware (DA) blocks, as known in the art. However, while existing methods that utilize DA blocks typically utilize a kernel prediction network to steer the weights according to a degradation vector, according to the present implementation a different set of weights $\theta^{S_i}$ per subset $S_i$. Micro-RN 460 is defined by two parameters: $C_h$, the number of hidden channels, and B, the number of DA Blocks. In one implementation, a 3×3 convolution may be used. Referring to FIG. 4B, DConv denotes a depthwise convolution. Micro-RN 460 is trained with the teacher-student architecture shown in FIG. 4A, while the head 456 and tail 458 of student-decoder 438 (hereinafter "ML model-based video decoder 438") are pre-trained and borrowed from teacher-decoder 452.

Let $x \in S_1$ be an image of subset $S_1$ and $\tilde{x}$ be the image compressed by the teacher network. According to the present concepts, the following loss function is optimized:

$$\mathcal{L}(x;\theta^S) = k_M \text{MSE}(\tilde{x},\hat{x}) + k_p d_p(\hat{x},x) \quad \text{(Equation 4)}$$

where $\hat{x}$ is the output of the student network, MSE (mean squared error) and $d_p$ are the distortion losses, and $k_M$ and $k_p$ are their corresponding weights. The perceptual loss $d_p$=LPIPS is used. As a result, the loss forces ML model-based video decoder 438 to generate images that look similar to those generated by teacher-decoder 452 and further reduces the perceptual loss to the ground truth image. It is noted that the encoder and the entropy model, which may be modeled using a hyperprior, are frozen. Consequently, compression data 236 "$\theta_{S_i}$" only contains the weights of Micro-RN 460. This advantageously leverages the powerful encoder and hyperprior of HiFiC as well as the model's knowledge of the private training data set.

Figure 5:
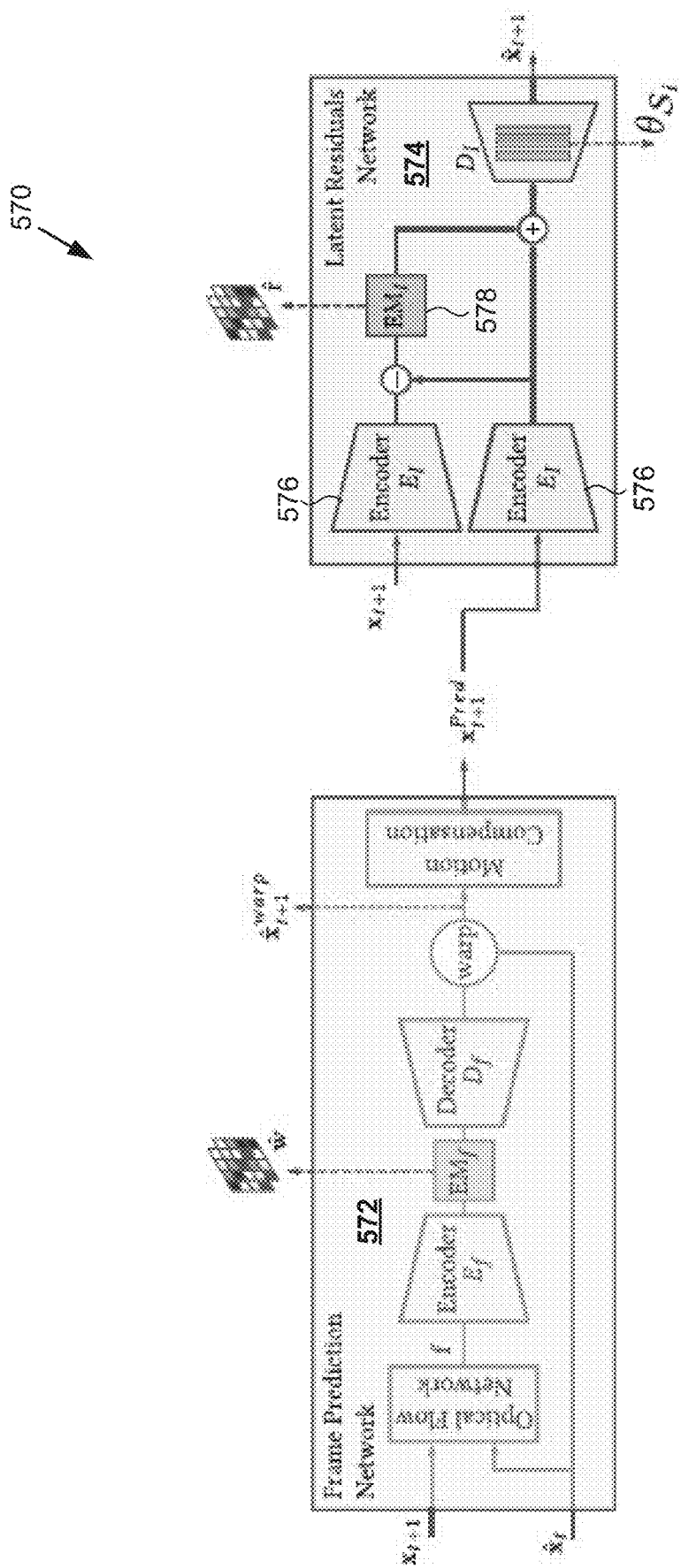
FIG. 5 shows a video compression pipeline for implementing knowledge distillation (KD) techniques including microdosing for low bit rate video compression, according to one implementation.

To show the application of KD in neural video compression scenarios, a network such as network 570 in FIG. 5 may be used. As shown in FIG. 5, network 570 includes two parts: Frame Prediction Network (FPN) 572 and Latent Residual Network (LRN) 574. Given a sequence of frames (group of pictures, or GOP) to be encoded $x_0, \ldots, x_{GOP}$, where $x_0$ is a keyframe (I-frame) and $x_1, \ldots, x_{GOP}$ are predicted frames (P-frames), the compression of the sequence may work as follows:

First, the I-frame ($x_0$) may be compressed using a neural image compression network to generate the encoded latent $y_0$. Let $\hat{x}_0$ denote the reconstructed frame from the quantized latent $\hat{y}_0$. Then, for each P-frame, $x_{t+1}$, $1 \le t+1 \le \text{GOP}$: (1) a temporal prediction, $x_{t+1}^{Pred}$, of $x_{t+1}$ is generated from the previous reconstructed frame, $\hat{x}_t$, using FPN 692. FPN 692 works by first computing the optical flow $f_{t+1}$ between $x_{t+1}$ and $\hat{x}_t$. (2) Use the neural motion compression network to generate the encodings and quantized latents $\hat{w}_{t+1}$ of $f_{t+1}$. (3) Warp $\hat{x}_t$ with the decompressed flow $\hat{f}_{t+1}$, and then motion compensate it to generate the temporal $x_{t+1}^{Pred}$.

To compute the residual between the temporal prediction and the P-Frame, LRN 574 is used to: (4) encode both, the prediction $x_{t+1}^{Pred}$ and $x_{t+1}$, with EI 576 (a pre-trained image compression encoder) and (5) compute the latent residual, $x_{t+1}$, between the latents of the P-frame against the predicted frame, $r_{t+1} = y_{t+1} - y_{t+1}^{Pred}$, which is then quantized and entropy coded with $\text{EM}_I$ 578. The final compressed bitstream of a GOP is then composed of $\{\hat{y}_0, \hat{w}_1, \ldots, \hat{w}_{GOP}, \hat{r}_1, \ldots, \hat{r}_{GOP}\}$ i.e., latent of the I-frame and the compressed flow fields and latent residuals for each of the P-frames (all quantized and entropy encoded).

In the low bitrate setting, HiFiC would scent like a suitable choice for the neural image compression architecture that could be used together with the above latent space residual framework. As noted above, however, the size of the HiFiC decoder is a limiting factor. Moreover, inference time can be critical in the video where maintaining a decoding frame rate of approximately thirty frames per seconds (30 fps) is often necessary. The microdosing solution disclosed in the present application advantageously advances the state-of-the-art by increasing computational efficiency while reducing inference time. During encoding, the present solution is overfitted to a specific sequence so that the $\theta_{s_i}$ only need to be sent once for all the frames of that sequence. The present novel and inventive decoding process then proceeds by receiving and loading sequence-specific Micro-RN weights on ML model-based video decoder 438, which is then fixed during the decode of the sequence. As a result of the small computational overhead imposed by the present microdosing solution, decoding time can advantageously be reduced by 50% while achieving visual that is similar to bigger and slower existing decoders.

Figure 6:
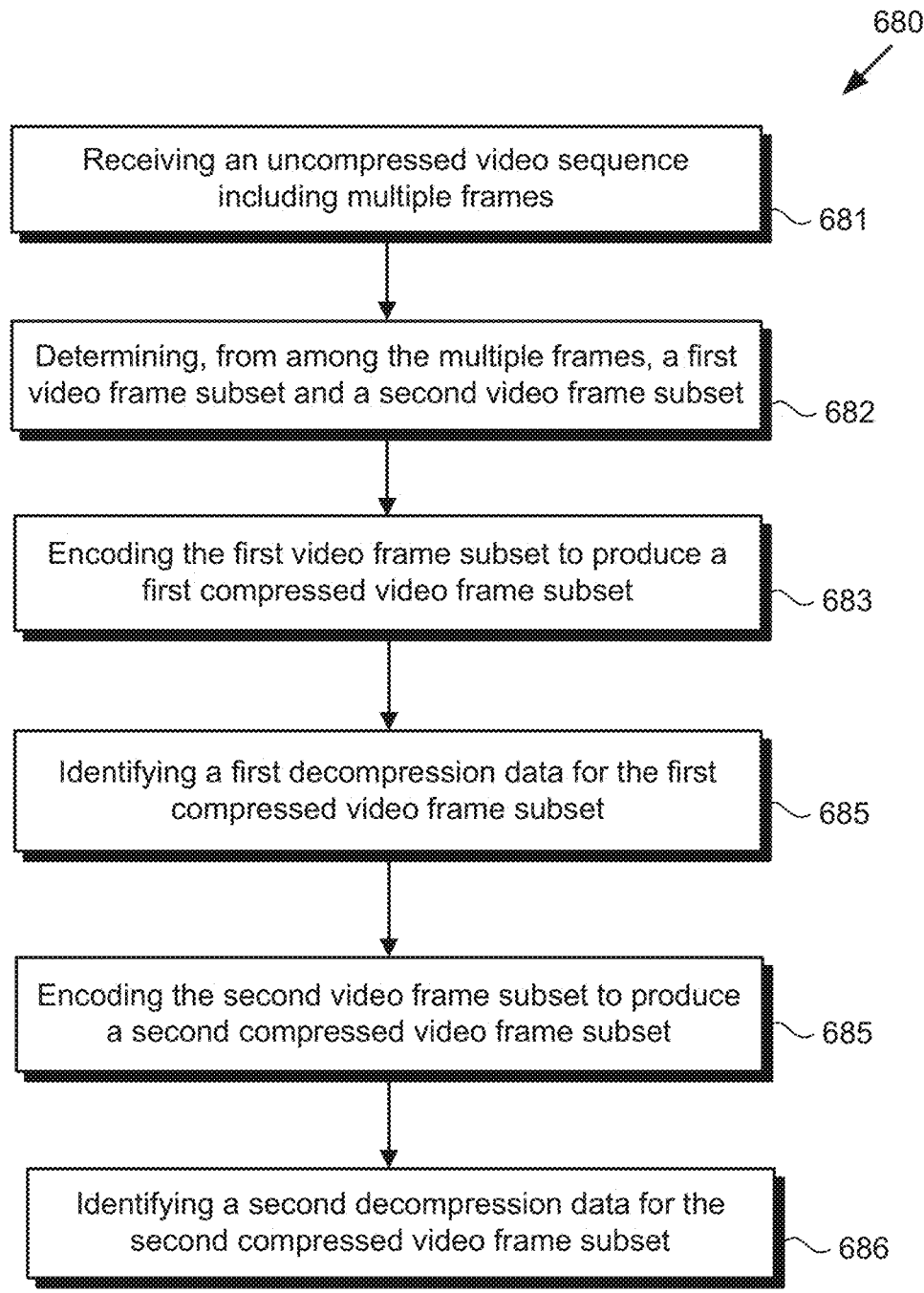
FIG. 6 shows a flowchart outlining an exemplary method of performing microdosing for low nitrate video compression, according to one implementation.
Figure 7:
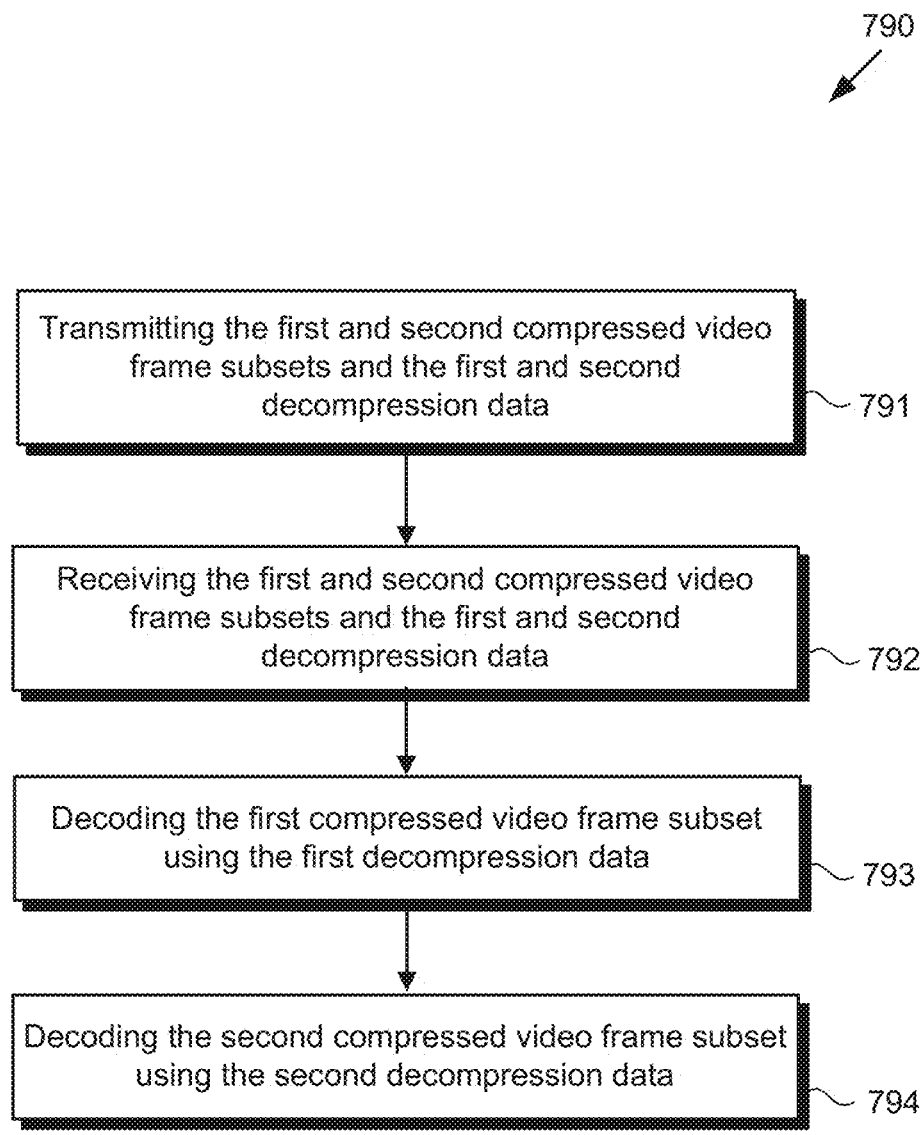
FIG. 7 shows a flowchart describing additional actions for extending the method outlined in FIG. 6, according to one implementation.

The knowledge distillation with microdosing approach described above by reference to FIGS. 2, 3, 4A, 4B, and 5 will be further described by reference to FIGS. 6 and 7. FIG. 6 shows flowchart 680 presenting an exemplary method of performing microdosing for low bitrate video compression, according to one implementation, while FIG. 7 shows flowchart 790 describing additional actions for extending the method outlined in FIG. 6. With respect to the actions described in FIGS. 6 and 7, it is noted that certain details and features have e left out of flowcharts 680 and 790 in order to not obscure the discussion of the inventive features in the present application.

Referring now to FIG. 6 in combination with FIGS. 1 and 2, flowchart 680 includes receiving uncompressed video sequence 116/216 including multiple video frames (action 681). As shown in FIG. 2, uncompressed video sequence 116/216 may be received in action 681 by ML model-based videos encoder 108/208. Moreover, and as noted above by reference to FIG. 1, ML model-based video encoder 108/208 may be stored in system memory 106. Thus, uncompressed video sequence 116/216 may be received in action 681 by ML model-based video encoder 108/208 executed by processing hardware of 104 of system 100.

Flowchart 680 further includes determining, from among the plurality of video frames, a first video frame subset and a second video frame subset (action 682). In some implementations, the determination of the first video frame subset and the second video frame subset, in action 682 may be based on similarity and dissimilarity among the video frames included in uncompressed video sequence 116/219. In other words, in some implementations, the first video frame subset determined in action 682 may include video frames that are visually similar to one another, while the second video frame subset may include other video frames that are more visually similar to one another than to the video frames included in the first video frame subset. Continuing to refer to FIGS. 1 and 2 in combination, determination of the first video frame subset and the second video frame subset in action 682 may be performed by ML model-based video encoder 108/208, executed by processing hardware of 104 of system 100.

Flowchart 680 further includes encoding the first video frame subset determined in action 682 to produce first compressed video frame subset $\hat{s}_1$ (action 683). As described above, the encoding of the first video frame subset to produce first compressed video frame subset $\hat{s}_1$, in action 683, may be performed by ML model-based video encoder 108/208, executed by processing hardware of 104 of system 100.

Flowchart 680 further includes identifying first decompression data $\theta_{\hat{s}_1}$ for first compressed video frame subset $\hat{s}_1$ (action 684). In some implementations, identifying first decompression data $\theta_{\hat{s}_1}$ comprises overfitting first decompression data $\theta_{\hat{s}_1}$ during the encoding of the first video frame subset in action 683. That is to say, in some implementations, identification of first decompression data $\theta_{\hat{s}_1}$ in action 684, may be performed in parallel, i.e., substantially concurrently, with the encoding of the first video frame subset to produce first compressed video frame subset $\hat{s}_1$ in action 682. As described above, identifying first decompression data $\theta_{\hat{s}_1}$ for first compressed video frame subset $\hat{s}_1$, in action 684, may be performed by ML model-based video encoder 108/208, executed by processing hardware of 104 of system 100.

Flowchart 680 further includes encoding the second video frame subset determined in action 682 to produce second compressed video frame subset $\hat{s}_2$ (action 685). As described above, the encoding of the second video frame subset to produce second compressed video frame subset $\hat{s}_2$, in action 685, may be performed by ML model-based video encoder 108/208, executed by processing hardware of 104 of system 100.

Flowchart 680 further includes identifying second decompression data $\theta_{\hat{s}_2}$ for second compressed video frame subset $\hat{s}_2$ (action 686). In some implementations, identifying second decompression data $\theta_{\hat{s}_2}$ comprises overfitting second decompression data $\theta_{\hat{s}_2}$ during the encoding of the second video frame subset in action 685. That is to say, in some implementations, identification of second decompression data $\theta_{\hat{s}_2}$ in action 686, may be performed in parallel, i.e., substantially concurrently, with the encoding of the second video frame subset to produce second compressed video frame subset $\hat{s}_2$ in action 685. As described above, identifying first decompression data $\theta_{\hat{s}_2}$ for second compressed video frame subset2, in action 686, may be performed by ML model-based video encoder 108/208, executed by processing hardware of 104 of system 100.

With respect to first and second decompression data $\theta_{\hat{s}_1}$ and $\theta_{\hat{s}_1}$, it is noted that those data are specific to the respective compressed video frame subsets they accompany. Thus, first decompression data $\theta_{\hat{s}_1}$ is specific to decoding first compressed video frame subset $\hat{s}_1$ but not second compressed video frame subset $\hat{s}_2$, and second decompression data $\theta_{\hat{s}_2}$ is specific to decoding second compressed video frame subset $\hat{s}_2$ but not first compressed video frame subset $\hat{s}_2$.

It is further noted that although flowchart 680 depicts actions 685 and 686 as following actions 683 and 684, that representation is provided merely by way of example. In some other implementations, actions 683 and 685 may be performed in parallel prior to actions 684 and 686, which, in some implementations, may also be performed in parallel. Thus, in some implementations, action 683 and 684 may be performed in parallel with action 685 and 686.

In some implementations, the method outlined by flowchart 680 may conclude with action 686. However, in other implementations, that method may be extended by one or more of the actions described by flowchart 790, in FIG. 7. Referring now to FIG. 7 in combination with FIGS. 1 and 2, flowchart 790 includes transmitting, to ML model-based video decoder 138/238/438, first compressed video frame subset $\hat{s}_1$, second compressed video frame subset $\hat{s}_2$, first decompression data $\theta_{S_1}$, and second decompression data $\theta_{S_2}$ (action 791). As shown in FIG. 2, first compressed video frame subset $S_1$, second compressed video frame subset $S_2$, first decompression data $\theta_{S_1}$, and second decompression data $\theta_{S_2}$ may be transmitted to ML model-based video decoder 138/238/438, in action 791, by ML model-based video encoder 108/208, executed by processing hardware 104 of system 102, via communication network 110 and network communication links 112.

Flowchart 790 further includes receiving first compressed video frame subset $S_1$, second compressed video frame subset $S_2$, first decompression data $\theta_{S_1}$, and second decompression data $\theta^{S_2}$ (action 792). As shown in FIG. 2, first compressed video frame subset $S_1$, second compressed video frame subset $S_2$, first decompression data $\theta_{S_1}$, and second decompression data $\theta^{S_2}$ may be received in action 792 by ML model-based video decoder 138/238/438. In some implementations, ML model-based video decoder may be executed by user system processing hardware 124. However, and as noted above by reference to FIG. 1, in some implementations, user system may 120 may be a dumb terminal peripheral component of system 100. In those latter implementations, ML model-based video decoder 138/238/438 is included as a feature of system 100, and be executed to perform action 792 by processing hardware of 104 of system 100.

Flowchart 790 further includes decoding first compressed video frame subset $S_1$ using first decompression data $\theta_{S_1}$ (action 793). As described above, the decoding of first compressed video frame subset $S_1$ using first decompression data $\theta_{S_1}$, in action 793, may be performed by ML model-based video decoder 138/238/438, executed by user system processing hardware 124, or by processing hardware of 104 of system 100.

In some implementations, as noted above, ML model-based video decoder 138/238/438 may include an NN, such as a MicroRN for example. In implementations in which ML model-based video decoder 138/238/438 includes a MicroRN, first decompression data $\theta_{S_1}$ may contain only the weights of that MicroRN for use in decoding first compressed video frame subset $S_1$. Moreover, in some implementations, first decompression data $\theta_{S_1}$ may be received once, and only once, for decoding first compressed video frame subset $S_1$ in its entirety.

Flowchart 790 further includes decoding second compressed video frame subset $S_2$ using second decompression data $\theta^{S_2}$ (action 794). As described above, the decoding of second compressed video frame subset $\theta^{S_2}$ using first decompression data $\theta^{S_2}$, in action 794, may be performed by ML model-based video decoder 138/238/438, executed by user system processing hardware 124, or by processing hardware of 104 of system 100.

In implementations in which ML model-based video decoder 138/238/438 includes a MicroRN, second decompression data $\theta^{S_2}$ may contain only the weights of that MicroRN for use in decoding first compressed video frame subset $S_2$. Moreover, in some implementations, second decompression data $\theta^{S_2}$ may be received once, and only once, for decoding second compressed video frame subset $S_2$ in its entirety.

It is noted that although flowchart 790 depicts action 794 as following action 793, that representation is provided merely by way of example. In some implementations, the decoding of first compressed video frame subset $S_1$ using first decompression data $\theta^{S_1}$, in action 793, and the decoding of second compressed video frame subset $S_2$ using second decompression data $\theta^{S_2}$, in action 794, may be performed in parallel, i.e., substantially concurrently.

Regarding the combination of ML model-based video encoder 108/208 and ML model-based video decoder 138/238/438, it is noted that ML model-based video encoder 108/208 may be implemented as a HiFiC encoder, while ML model-based video decoder 138/238/438 is configured so as to have fewer parameters, such as ten time fewer parameters for example, than a HiFiC decoder, i.e. a large decoder that does not use first decompression data $\theta^{S_1}$, and second decompression data $\theta^{S_2}$. Moreover, ML model-based video decoder 138/238/438 may be configured so as to achieve a faster decoding time, such as a fifty percent (50%) faster decoding time for example, than a HiFiC decoder, i.e., a large decoder that does not use first decompression data $\theta_{S_1}$, and second decompression data $\theta^{S_2}$.

With respect to the actions described in FIGS. 6 and 7, it is noted that in various implementations, actions 681, 682, 683, 684, 685, and 686 (hereinafter "actions 681-686") of flowchart 680, or actions 681-686 and action 791 of flowchart 790, or actions 681-686, 791, 792, 793, and 794, may be performed as automated processes from which human participation may be omitted.

Thus, the present application discloses a framework including an ML model-based video compression solution based on knowledge distillation (KD) and microdosing to enable use of a video compression codec that has similar hallucination capacity to a trained GAN, which is particularly important when targeting low bit-rate video compression. In addition, the present application discloses an approach that enables the retention of good perceptual image quality while reducing the size of the decoder. According to the present novel and inventive principles, the goal of KD is to transfer the learned knowledge of a teacher network to a smaller student network that remains competitive to the teacher network's performance. By requiring less memory and computational power than the initial teacher network, the student network could advantageously be run on less powerful devices such as mobile phones or dedicated devices. The ability to compress the generator network or decoder in the auto-encoder setting, as disclosed above, is advantageous both in terms of memory requirements and computational efficiency.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a machine learning (ML) model-based video encoder; and
    an ML model-based video decoder comprising a degradation-aware block based Micro-Residual-Network (MicroRN) defined by a number of hidden channels and a number of degradation-aware blocks of the MicroRN, the MicroRN configured to decode a first compressed video frame subset using a first decompression data, and decode a second compressed video frame subset using a second decompression data, without utilizing a residual network of a generative adversarial network (GAN) trained decoder;

the ML model-based video encoder configured to:
receive an uncompressed video sequence including a plurality of video frames;
determine, from among the plurality of video frames, a first video frame subset and a second video frame subset;
encode the first video frame subset to produce the first compressed video frame subset;
identify the first decompression data for the first compressed video frame subset;
encode the second video frame subset to produce the second compressed video frame subset; and
identify the second decompression data for the second compressed video frame subset.

2. The system of claim 1, wherein identifying the first decompression data comprises overfitting the first decompression data during the encoding of the first video frame subset, and wherein identifying the second decompression data comprises overfitting the second decompression data during the encoding of the second video frame subset.

3. The system of claim 1, wherein:
the ML model-based video encoder is further configured to:
transmit, to the ML model-based video decoder, the first compressed video frame subset, the second compressed video frame subset, the first decompression data, and the second decompression data;
the ML model-based video decoder is configured to:
receive the first compressed video frame subset, the second compressed video frame subset, the first second decompression data, and the second decompression data;
decode the first compressed video frame subset using the first decompression data; and
decode the second compressed video frame subset using the second decompression data.

4. The system of claim 3, wherein the first decompression data is received only once for decoding of the first compressed video frame subset, and wherein the second decompression data is received only once for decoding of the second compressed video frame subset.

5. The system of claim 1, wherein the first decompression data is specific to decoding the first compressed video frame subset but not the second compressed video frame subset, and the second decompression data is specific to decoding the second compressed video frame subset but not the first compressed video frame subset.

6. The system of claim 1, wherein the first decompression data and the second decompression data contain only weights of the MicroRN.

7. The system of claim 1, wherein the ML model-based video encoder comprises a High-Fidelity Compression (HiFiC) encoder, and wherein the ML model-based video decoder includes at least ten times fewer parameters than a HiFiC decoder not using the first decompression data and the second decompression data.

8. The system of claim 1, wherein the ML model-based video encoder comprises a HiFiC encoder, and wherein the ML model-based video decoder is fifty percent faster than a HiFiC decoder not using the first decompression data and the second decompression data.

9. A method for use by a system including a machine learning (ML) model-based video encoder and an ML model-based video decoder comprising a degradation-aware block based Micro-Residual-Network (MicroRN) defined by a number of hidden channels and a number of degradation-aware blocks of the MicroRN, the MicroRN configured to decode a first compressed video frame subset using a first decompression data, and decode a second compressed video frame subset using a second decompression data, without utilizing a residual network of a generative adversarial network (GAN) trained decoder, the method comprising:
receiving, by the ML model-based video encoder, an uncompressed video sequence including a plurality of video frames;
determining, by the ML model-based video encoder from among the plurality of video frames, a first video frame subset and a second video frame subset;
encoding, by the ML model-based video encoder, the first video frame subset to produce the first compressed video frame subset;
identifying, by the ML model-based video encoder, the first decompression data for the first compressed video frame subset;
encoding, by the ML model-based video encoder, the second video frame subset to produce the second compressed video frame subset; and
identifying, by the ML model-based video encoder, the second decompression data for the second compressed video frame subset.

10. The method of claim 9, wherein identifying the first decompression data comprises overfitting the first decompression data during the encoding of the first video frame subset, and wherein identifying the second decompression data comprises overfitting the second decompression data during the encoding of the second video frame subset.

11. The method of claim 9, further comprising:
transmitting, by the ML model-based video encoder, the first compressed video frame subset, second compressed video frame subset, the first decompression data, and second decompression data to an ML model-based video decoder;
receiving, by the ML model-based video decoder, the first compressed video frame subset, second compressed video frame subset, the first decompression data, and second decompression data;
decoding, by the ML model-based video decoder, the first compressed video frame subset using the first decompression data; and
decoding, by the ML model-based video decoder, the second compressed video frame subset using the second decompression data.

12. The method of claim 11, wherein the first decompression data is received only once for decoding of the first compressed video frame subset, and wherein the second decompression data is received only once for decoding of the second compressed video frame subset.

13. The method of claim 11, wherein the first decompression data is specific to decoding the first compressed video frame subset but not the second compressed video frame subset, and the second decompression data is specific to decoding the second compressed video frame subset but not the first compressed video frame subset.

14. The method of claim 9, wherein the first decompression data and the second decompression data contain only weights of the MicroRN.

15. The method of claim 9, wherein the ML model-based video encoder comprises a High-Fidelity Compression (HiFiC) encoder, and wherein the ML model-based video decoder includes at least ten times fewer parameters than a HiFiC decoder not using the first decompression data and the second decompression data.

16. The method of claim 9, wherein the ML model-based video encoder comprises a HiFiC encoder, and wherein the ML model-based video decoder is fifty percent faster than a HiFiC decoder not using the first decompression data and the second decompression data.

\* \* \* \* \*